(12) United States Patent
Kipnis et al.

(10) Patent No.: US 9,106,407 B2
(45) Date of Patent: Aug. 11, 2015

(54) KEY GENERATION USING MULTIPLE SETS OF SECRET SHARES

(75) Inventors: Aviad Kipnis, Efrat (IL); Eliphaz Hibshoosh, Tel Aviv (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 13/976,717

(22) PCT Filed: Apr. 23, 2012

(86) PCT No.: PCT/IB2012/052022
§ 371 (c)(1),
(2), (4) Date: Jun. 27, 2013

(87) PCT Pub. No.: WO2012/176076
PCT Pub. Date: Dec. 27, 2012

(65) Prior Publication Data
US 2013/0272521 A1    Oct. 17, 2013

(30) Foreign Application Priority Data

Jun. 20, 2011 (IL) .......................................... 213662

(51) Int. Cl.
*H04L 9/00* (2006.01)
*H04L 9/08* (2006.01)

(52) U.S. Cl.
CPC .............. *H04L 9/0816* (2013.01); *H04L 9/085* (2013.01); *H04L 9/0833* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 6,654,883 B1 | 11/2003 | Tatebayashi | |
| 7,778,421 B2 | 8/2010 | Bellwood et al. | |
| 7,849,016 B2 | 12/2010 | So | |
| 7,861,096 B2 | 12/2010 | Staddon et al. | |
| 2003/0002668 A1 | 1/2003 | Graunke et al. | |
| 2004/0086121 A1* | 5/2004 | Viggiano et al. | 380/255 |
| 2004/0177369 A1* | 9/2004 | Akins, III | 725/31 |
| 2008/0181398 A1 | 7/2008 | Pappu | |
| 2009/0282243 A1* | 11/2009 | Rose et al. | 713/159 |
| 2011/0286595 A1 | 11/2011 | Resch et al. | |

FOREIGN PATENT DOCUMENTS

EP    1 119 132 A2    7/2001

OTHER PUBLICATIONS

Aug. 20, 2012 Transmittal of International Search Report and Written Opinion of International Searching Authority for the captioned application.

Adi Shamir, "How to Share a Secret," *Communications for the Association for Computing Machinery*, vol. 22, No. 11, pp. 612-613 (Nov. 1979).

Hsien-Chu Wu et al., "Sharing Visual Multi-Secrets Using Circle Shares," *Computer Standards & Interfaces* 28, pp. 123-135 (2005).

* cited by examiner

*Primary Examiner* — Fatoumata Traore
(74) *Attorney, Agent, or Firm* — Hahn Loeser & Parks LLP

(57) ABSTRACT

A cryptographic method, including generating, using a meta-secret, a first plurality of cryptographic keys, each cryptographic key associated with a respective key identifier, creating, using the meta-secret, a second plurality of sets of secret-shares, which are capable, by combining all the secrets-shares in any one of the sets together with the respective key identifier, of generating the associated cryptographic key, and performing cryptographic operations using the cryptographic keys. Related methods and apparatus are also included.

18 Claims, 5 Drawing Sheets

US 9,106,407 B2

KEY GENERATION USING MULTIPLE SETS OF SECRET SHARES

RELATED APPLICATION INFORMATION

The present application is a 35 USC §371 application of PCT/IB2012/052022, filed on 23 Apr. 2012 and entitled "Key Generation Using Multiple Sets of Secret Shares", which was published on 27 Dec. 2012 in the English language with International Publication Number WO 2012/176076 and which relies for priority on Israel Patent Application IL 213662, filed 20 Jun. 2011.

FIELD OF THE INVENTION

The present invention relates generally to digital communications, and specifically to methods and systems for secure transmission and reception of digital information.

BACKGROUND OF THE INVENTION

Many digital content distribution systems use conditional access (CA), which requires the receiver to meet certain criteria before being able to decrypt and display a given content item, such as a video program or broadcast channel. The content is encrypted using a secret key, referred to as a control word (CW). (This sort of encryption is commonly referred to as "scrambling.") The CW itself is encrypted by entitlement control messages (ECMs), which are transmitted from the system head-end to receivers of the content item. The CA subsystem (such as a secure smart card) in each receiver decrypts the ECM to recover the CW for a given content channel, but only when the receiver is authorized to do so by an entitlement management message (EMM) for the given channel. EMMs are typically transmitted periodically (for example, once per month) to the CA subsystem, depending on the subscriber's service plan.

In secret sharing schemes, a secret (such as a cryptographic key) is shared among a group of participants, each of whom is allocated a share of the secret. The secret can be reconstructed only when a sufficient number of secret-shares are combined together, while individual shares are of no use on their own. A method for secret sharing based on polynomials, for example, was described by Shamir in "How to Share a Secret," *Communications of the ACM* 22:11 (1979), pages 612-613.

SUMMARY

Embodiments of the present invention that are described hereinbelow provide efficient methods for secret sharing.

There is therefore provided, in accordance with an embodiment of the present invention, a cryptographic method, which includes generating, using a meta-secret, a first plurality of cryptographic keys, each cryptographic key associated with a respective key identifier. The meta-secret is used to create a second plurality of sets of secret-shares, which are capable, by combining all the secrets-shares in any one of the sets together with the respective key identifier, of generating the associated cryptographic key. Cryptographic operations are performed using the cryptographic keys.

Typically, performing the cryptographic operations includes encrypting an item of data using one of the cryptographic keys so as to enable decryption of the item only by combining all the secret-shares in any one of the sets. In disclosed embodiments, encrypting the items of data includes encrypting multiple items of data using different ones of the cryptographic keys, so as to enable decryption of the items by combining all the secret-shares in any one of the sets with different key identifiers that are respectively associated with the different ones of the cryptographic keys.

In some embodiments, the sets of secret-shares each include first and second secret-shares, and the method includes distributing the sets of secret-shares to different, respective subscriber premises, and providing the first and second secret-shares in each set to different first and second devices in each of the subscriber premises, which operate in combination to generate the cryptographic keys so as to decrypt the items of data. The first and second devices may respectively include a security module and a host device, to which the security module is coupled and which is configured to output the decrypted items of data. Alternatively, the first and second devices may include respective first and second security modules.

In other embodiments, the method includes distributing the sets of secret-shares to different, respective subscribers in an encrypted form, wherein the secret-shares in each of the sets are decrypted following a process of authentication so that the secret-shares can be used to generate the cryptographic keys so as to decrypt the items of data only after the authentication. The sets of secret-shares may each include first and second secret-shares, which are decrypted respectively by two independent content access centers. In a disclosed embodiment, the items of the data are encrypted and the secret-shares are generated by a content provider, and the secret-shares are distributed with the key identifiers to the subscribers by a content broker, which is unable to access the items of the data in an unencrypted form or to generate the secret-shares or the cryptographic keys.

In disclosed embodiments, the meta-secret includes a sequence of matrices, and generating the cryptographic keys includes computing a respective bit string corresponding to each key identifier, and taking a trace of a product of a sub-sequence of the matrices that is indexed by the bit string. Computing the respective bit string may include calculating a hash function over the key identifier.

In a disclosed embodiment, combining all the secrets-shares includes applying each of the secret-shares within a set together with the key identifier to generate a respective key-share, thereby producing multiple, different key-shares, and combining the key-shares to generate the cryptographic key.

In some embodiments, the meta-secret includes a first sequence of first matrices, and creating the sets of the secret-shares includes, for a given secret-share within a set, finding a second sequence of second matrices such that a first characteristic polynomial of a $k^{th}$ matrix in the first sequence of first matrices divides a second characteristic polynomial of a tensor product of all $k^{th}$ second matrices in the second sequence for all the secret-shares in the set. In a disclosed embodiment, finding the second sequences includes finding matrices $\{A_{ijk}'\}$ such that a product of all the matrices $A'_{ijk}$ over a secret-share index j within the set is equal to the $r^{th}$ matrix in the first sequence, and all $A'_{ijk}$ commute for all indices j and r, and transforming the matrices $\{A_{ijk}'\}$ using random invertible matrices $T_{i,j}$ to give transformed matrices $A_{ijk} = T_{i,j} \cdot A_{ijk}' \cdot T_{i,j}^{-1}$ that make up the secret-shares.

Additionally or alternatively, combining all the secret-shares includes, for a given set in the second plurality, computing a bit string corresponding to the respective key identifier, for each of the secret-shares in the given set, computing a product of a respective sub-sequence of the second matrices that is indexed by the bit string, and generating a polynomial based on the product, and extracting a coefficient of the polynomial to provide the cryptographic key that is associated with the key identifier. Generating the polynomial may include taking a recursive tensor product of a set of third matrices defined by the product of the respective sub-sequence for all the secret-shares, extracting a characteristic polynomial from the tensor product of all the third matrices, and finding a greatest common denominator of the characteristic polynomial with a further polynomial that is associated with the key identifier to give a result polynomial from which the coefficient is extracted.

The method may include decomposing at least one of the secret-shares to generating a subsidiary set of subsidiary secret-shares, which are capable, by combining all the subsidiary secrets-shares in the subsidiary set together with the respective key identifier, of generating a key-share associated with the at least one of the secret-shares.

There is also provided, in accordance with an embodiment of the present invention, a cryptographic method, which includes receiving a set of secret-shares and receiving a plurality of key identifiers, each key identifier associated with a different, respective cryptographic key. All the secret-shares are used together with any one of the key identifiers to generate the associated cryptographic key, which may be used in performing a cryptographic operation.

In some embodiments, using all the secret-shares includes applying each of the secret-shares together with the key identifier to generate a respective key-share, thereby producing multiple, different key-shares, and combining the key-shares to generate the cryptographic key. In some of these embodiments, applying each of the secret-shares includes applying first and second secret-shares respectively in different first and second devices in order to generate first and second key-shares, which are combined to generate the cryptographic key. The first and second devices may respectively include a security module and a host device, to which the security module is coupled and which is configured to perform the cryptographic operation using the cryptographic key. Alternatively, the first and second devices may respectively include first and second security modules, which are coupled to different respective host devices.

In another embodiment, receiving the set of the secret-shares includes a ticket containing at least first and second secret-shares, and using all the secret-shares includes conveying the first and second secret-shares over a network to first and second servers, respectively, and receiving first and second key-shares from the first and second servers in order to generate the cryptographic key. The first and second servers may respectively include two independent and separate content access centers.

Typically, the set of secret-shares is one of multiple different sets of different secret-shares, any of which sets can be used with any one of the key identifiers to generating the associated cryptographic key.

There is additionally provided, in accordance with an embodiment of the present invention, cryptographic apparatus, including a memory, which is configured to hold a meta-secret. A processor is configured to generate, using the meta-secret, a first plurality of cryptographic keys, each cryptographic key associated with a respective key identifier, and to create, using the meta-secret, a second plurality of sets of secret-shares, which are capable, by combining all the secrets-shares in any one of the sets together with the respective key identifier, of generating the associated cryptographic key, and to perform cryptographic operations using the cryptographic keys.

There is further provided, in accordance with an embodiment of the present invention, cryptographic apparatus, including multiple memories, which are configured to store respective secret-shares in a set of the secret-shares. Multiple processors are coupled to respective ones of the memories and are configured to receive a plurality of key identifiers, each key identifier associated with a different, respective cryptographic key. The processors are configured to cooperate in using all the secret-shares together with any one of the key identifiers to generate the associated cryptographic key, so as to enable a cryptographic operation to be performed using the cryptographic key.

There is moreover provided, in accordance with an embodiment of the present invention, cryptographic apparatus, including an interface, which is configured to receive over a network a set of secret-shares and to receive a key identifier associated with a cryptographic key. A processor is configured to transmit the secret-shares over the network to different, respective servers, to receive key-shares computed by the servers using the secret-shares, to combine the key-shares with any one of the key identifiers to generate the associated cryptographic key, and to perform a cryptographic operation using the cryptographic key.

There is furthermore provided, in accordance with an embodiment of the present invention, a cryptographic system, including a content provider, which is configured to generate a first plurality of cryptographic keys, each cryptographic key associated with a respective key identifier, to encrypt a respective item of content using each cryptographic key, to generate a second plurality of sets of secret-shares, and to produce first tickets, each containing a respective set of the secret-shares. A content broker is configured to produce second tickets, each including the respective set of the secret-shares in a respective one of the first tickets and the respective key identifier for the item of content that is encrypted using the associated cryptographic key, and to furnish the second tickets to subscribers. A first content access center is coupled to receive from a subscriber a first one of the secret-shares in one of the second tickets, to authenticate the subscriber, and to return a first key-share to the subscriber. A second content access center is coupled to receive from the subscriber a second one of the secret-shares in one of the second tickets, to validate access to the item of content, and to return a second key-share to the subscriber. The subscriber combines the first and second key-shares to generate the cryptographic key and decrypt the item of content.

There is also provided, in accordance with an embodiment of the present invention, a computer software product, including a computer-readable medium in which program instructions are stored, which instructions, when read by a computer, cause the computer to generate, using a meta-secret, a first plurality of cryptographic keys, each cryptographic key associated with a respective key identifier, to create, using the meta-secret, a second plurality of sets of secret-shares, which are capable, by combining all the secrets-shares in any one of the sets together with the respective key identifier, of generating the associated cryptographic key, and to perform cryptographic operations using the cryptographic keys.

There is additionally provided, in accordance with an embodiment of the present invention, a computer software product, including a computer-readable medium in which program instructions are stored, which instructions, when read by a computer, cause the computer to receive a set of secret-shares and to receive a plurality of key identifiers, each key identifier associated with a different, respective cryptographic key, to use all the secret-shares with any one of the key identifiers to generate the associated cryptographic key, and to perform a cryptographic operation using the cryptographic key.

The present invention will be more fully understood from the following detailed description of the embodiments thereof, taken together with the drawings in which:

DETAILED DESCRIPTION OF EMBODIMENTS

Overview

Figure 1:
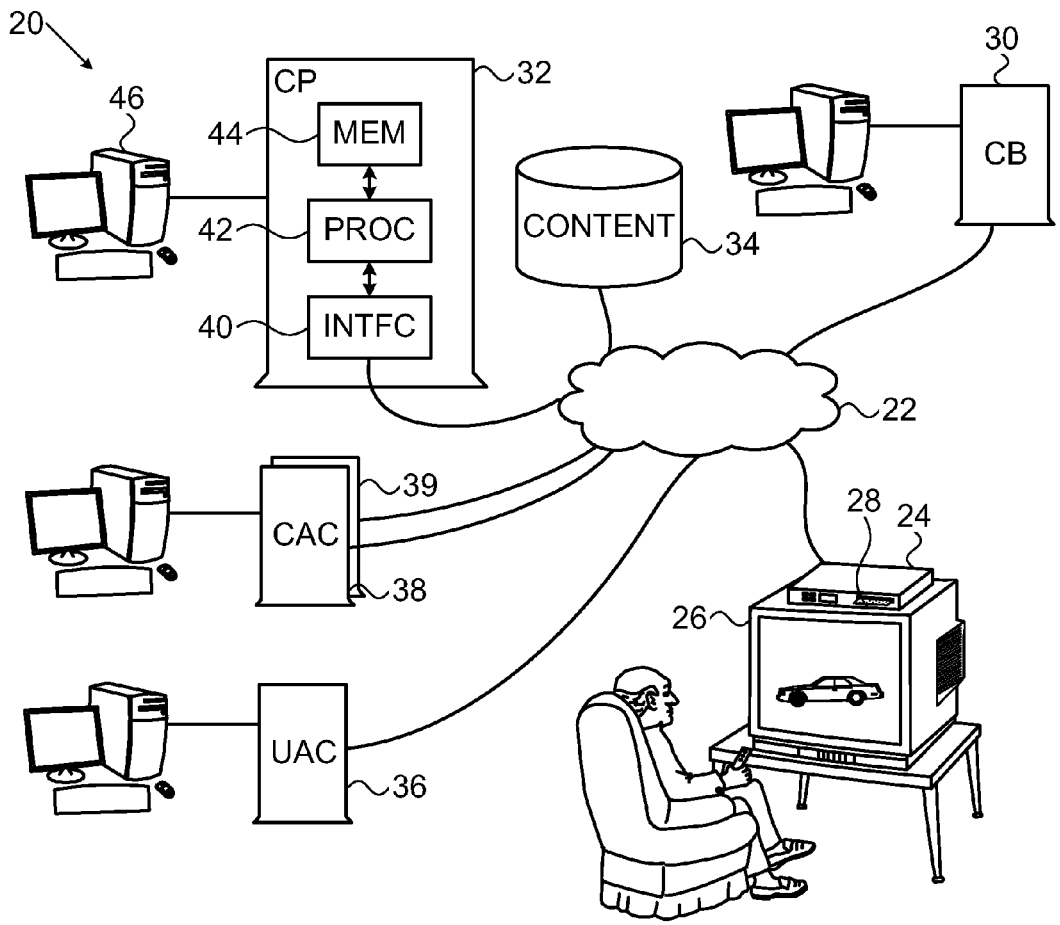
FIG. 1 is a schematic, pictorial illustration of a content distribution system, in accordance with an embodiment of the present invention.

Secret sharing can be an effective way to enhance the security of cryptographic applications, since such schemes require users to assemble multiple secret-shares in order to generate the desired key. Secret sharing techniques that are known in the art provide multiple sets of secret-shares where each set of secret-shares is equivalent in generating only a single key. This limitation can make large-scale applications impractical, as different sets of secret-shares are required for different keys.

Embodiments of the present invention that are described hereinbelow address this limitation by providing secret-sharing schemes in which multiple different sets of secret-shares can be used (and re-used) to generate a large number of different keys. These keys may be applied in encrypting items of data, and are thus particularly useful in (broadcast) conditional-access content distribution systems, in which many data items are distributed to different subscribers. Each data item is encrypted with its own key, and many copies of the encrypted data item are distributed to many different subscribers. The different data items (which are encrypted with different keys) are identified by unique key identifiers. Each subscriber uses the appropriate identifier together with his or her own distinct set of secret-shares to generate the keys that are needed for decryption of each of the many data items.

The secret-sharing schemes provided by embodiments of the present invention are based on a meta-secret—an ordered sequence of data values satisfying certain properties (as described below). The meta-secret is used both to generate multiple cryptographic keys and to generate multiple sets of secret-shares. As noted above, each key is typically associated with a particular asset (such as an item of data content), and is uniquely identified by a key identifier. The holder of the meta secret generates each cryptographic key by applying a key generation function to the respective key identifier and the meta-secret. The meta-secret holder also applies a secret-decomposition function to the meta-secret to generate the different sets of secret-shares.

A set of secret-shares is distributed among different secret holders in such a way that they can generate keys uniquely identified by a key identifier without knowledge of the meta secret. Each secret-share within a set of secret-shares uniquely defines a key-share-generation function that when used with a particular key identifier will provide its corresponding key-share. The resulting set of key-shares (corresponding to the set of secret-shares) are combined to yield the content key. The key-shares can subsequently be traced back to the respective secret-shares that produced them, thus making it possible to detect and take action against users who attempt to foil the scheme by giving their key-shares to others.

In some embodiments, the sets of secret-shares—typically (although not necessarily) with two secret-shares in each set—are distributed to different, respective subscriber premises. Each secret-share in each set is provided to a different decryption devices in the subscriber premises, and these devices operate in combination to generate the cryptographic keys and decrypt the items of data. If one of the devices is swapped or absent, the remaining device (or devices) will be unable to generate the keys. For example, one secret-share may be stored in a security module, such as a smart card, while the other is installed in a host device to which the smart card is coupled. As another example, the two secret-shares are stored in two different smart cards, which are coupled to different host devices. These approaches are helpful both in reducing the vulnerability of the cryptographic system to hacking and in preventing subscribers from sharing their keys with other, unauthorized users because of the inherent pairing of the devices that hold the secret-shares.

In another embodiment, a content provider uses the meta-secret in generating "virtual tickets" for sale to intermediaries, such as content brokers. Each virtual ticket is a data structure that enables a user (also referred to herein as a "subscriber") to access an item of content distributed by the content provider. The content broker creates a user-specific-license for the content offered that corresponds to a single virtual ticket instantiated for the specific user. Each content item is encrypted using a key generated by the content provider using the meta-secret, as described above. Each virtual ticket contains a set of secret-shares in an encrypted form, so that the intermediary cannot access the secret-shares or the content. Rather, the subscribers receive corresponding key-shares from authorized secret-share holders, subject to authentication and conditional access checks by the authorized secret-share holders that preclude the possibility of reuse of the virtual tickets. The subscribers then use the key-shares to generate the appropriate key to decrypt the content item that they have selected. This scheme gives the content provider secure, reliable control over content distribution without requiring any sort of relationship of trust with the intermediaries.

System Description

FIG. 1 is a schematic pictorial illustration of a system 20 for distribution of protected digital data, in accordance with an embodiment of the present invention. In the examples described herein, the digital data comprise program content and are alternatively referred to as "assets." The assets in the present example comprise video programs, which are distributed via a network 22 to various subscriber premises. Network 22 may comprise, for example, a packet network such as the Internet, a commercial cable network, a satellite network, or any other suitable type of wired and/or wireless data communication network or combination of such networks that is known in the art. Each user premises is typically equipped with a suitable receiver 24, such as personal computer or a set-top box (STB), which receives, decrypts, and decodes the asset from network 22 for user's consumption on a display monitor 26.

Receivers 24 may alternatively comprise any suitable sort of video decoder and may be implemented either as freestanding units, as shown in the figure, or in the form of embedded processing circuitry within a display device, such as a computer, entertainment console, or mobile media player. Furthermore, although the disclosed embodiments focus on video distribution, the principles of the systems and methods described herein may similarly be applied to distribution of substantially any type of media content, such as audio and/or textual media.

Typically, the assets transmitted in system 20 are encrypted and may be accessed by the user only in accordance with conditional access (CA) constraints. Receiver 24 decrypts the content using a software program running in the receiver and/or a security module, such as a smart card 28, which uses key-shares to generate control words to be used by the receiver in decrypting selected content. In the embodiments disclosed herein, smart card 28 operates in accordance with a secret sharing scheme, as described in greater detail hereinbelow.

In the example pictured in FIG. 1, users purchase content from a content broker (CB) 30, such as a local service provider who operates a portal and offers various content items from different content providers. One such content provider (CP) 32 is shown in FIG. 1, but in a typical scenario, multiple different content providers offer many different sorts of content items through many different content brokers. The secret-sharing scheme that is implemented in system 20 permits content brokers to purchase and re-sell user licenses for particular content items from content providers in substantially any desired quantity in a simple financial transaction (by automated on-line credit card payment, for example), without the need for any sort of relationship of trust or auditability. The instrument for effecting these transactions is a "virtual ticket," based on cryptographic secret-sharing, as described below.

CP 32 generates the keys (also referred to in this specific context as control words) for encrypting and decrypting content items, and also generates the secret-shares used in system 20 to generate the key-shares needed for content decryption by the user for its purchased content. For this purpose, CP 32 typically uses a computer, such as a cryptographic server, which is connected to network 22 by an interface 40. The server comprises a memory 44, which holds a meta-secret, i.e., a secret data structure that is used in generating the keys and secret-shares. A processor 42 accesses memory 44, computes the keys and secret-shares as required, and applies the keys in encrypting content items. A user interface 46 may be used to control and monitor functions of the server. The encrypted content items may be streamed onto network 22 by CP 32, or they may alternatively be stored in a content repository 34 for subsequent access.

Processor 42 typically comprises a general-purpose computer processing unit (or a cluster of such units), which is programmed in software to carry out the functions that are described herein. This software may be downloaded to the processor in electronic form, over a network, for example. Additionally or alternatively, the software may be provided and/or stored on tangible, non-transitory, computer-readable memory media, such as optical, magnetic, or electronic memory media. Further additionally or alternatively, at least some of the functions of processor 42 may be carried out by hard-wired or programmable digital logic circuits. The computational methods and data structures used by processor 42 in computing secret-shares and keys in one embodiment of the invention are described in the Appendix hereinbelow.

The content distribution scheme that is described above is facilitated by a number of additional servers on network 22: a user authorization center (UAC) 36, which authenticates subscribers and provides user credentials respected by other entities, and two independent content access centers (CAC) 38 and 39, which validate tickets for particular content items that subscribers purchase from CB 30. CAC and CAC each can decrypt a respective secret-share that is contained in the user's "ticket" in order to generate respective key-shares to be sent to the user. Typically, CAC 38 and CAC 39 operate separate and independent servers, each of which holds one of the secret-shares needed to generate the corresponding key-share for any particular content item. Alternatively, the functionality of one of the servers, such as CAC 39, can be implemented in smart card 28 or in a secure software module running in receiver 24. Details of the operation of this system are described further hereinbelow with reference to FIG. 3.

Figure 2:
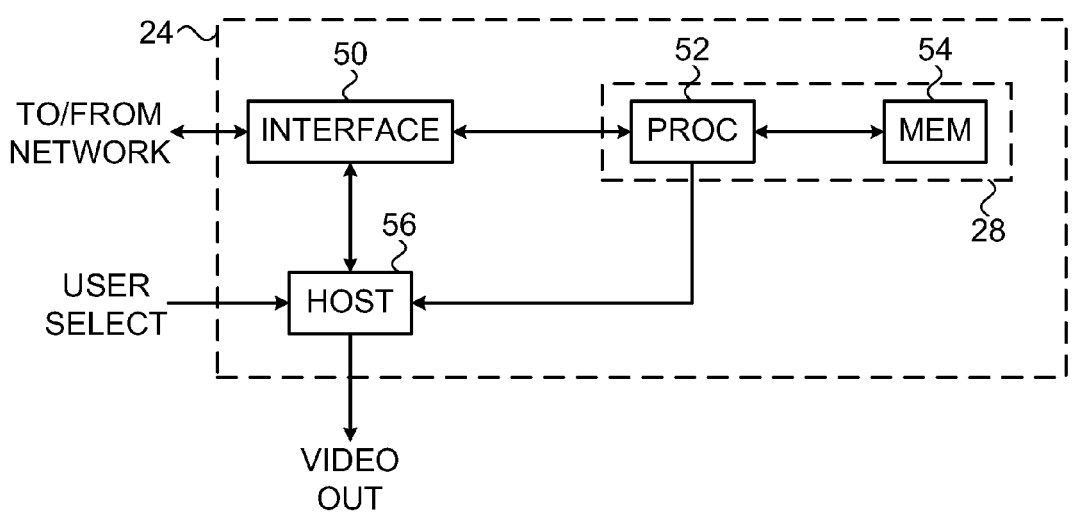
FIG. 2 is a block diagram that schematically illustrates a digital content receiver, in accordance with an embodiment of the present invention.

FIG. 2 is a block diagram that schematically shows details of receiver 24, in accordance with an embodiment of the present invention. Receiver 24 sends and receives messages and receives content from network 22 via a network interface 50. Assuming receiver 24 to be a set top box, a processor 52 in a security module, such as (optional) smart card 28, may receive and process incoming messages including content licenses for specific content and users (referred to herein as "tickets") and key-shares for given content items, as described below. The term "ticket," as used in the context of the present patent application and in the claims, refers to data structures containing information used in controlling access to a particular data item for a particular user; such information includes the secret-shares (decrypted by the CACs) and any limitations on use of the content. A memory 54 in the smart card may store secret-share information, which may be received via interface 50, as well, or may be pre-stored in the smart card before the card is inserted into receiver 24. Interface 50 passes content in encrypted form to a host processor 56, for decryption using appropriate control words.

Typically, key-shares may be provided to host 56 by entities on network 22, such as CAC 38 and CAC 39 (as in the embodiment of FIG. 3) or by smart cards 28 (as in the embodiment of FIG. 6); host 56 then combines the key-shares to generate the control word. Alternatively, (as in the embodiment of FIG. 5), host 56 uses the key identifier together with its key-share generation function to produce its key share, and combines it with a second key-share produced by processor 52 in smart card 28 to generate the control word. As another alternative, host 56 has no secret-share and receives one key-share from CAC 38, and a second key-share from smart card 28. In any case, the host processor applies the control word to decrypt and output the video content selected by the user.

Processor 52 and host processor 56 typically comprise general- or special-purpose programmable processors, which are programmed in software (typically firmware) to carry out the functions that are described herein. This software may be downloaded to the processors in electronic form, over a network, for example. Additionally or alternatively, the software may be provided and/or stored on tangible computer-readable memory media, such as optical, magnetic, or electronic memory media. Further additionally or alternatively, at least some of the functions of processors 52 and 56 may be carried out by hard-wired or programmable digital logic circuits. The computational methods and data structures used by these processors in computing and applying keys are described further hereinbelow.

Content Distribution Using Virtual Tickets with Secret-Shares

Figure 3:
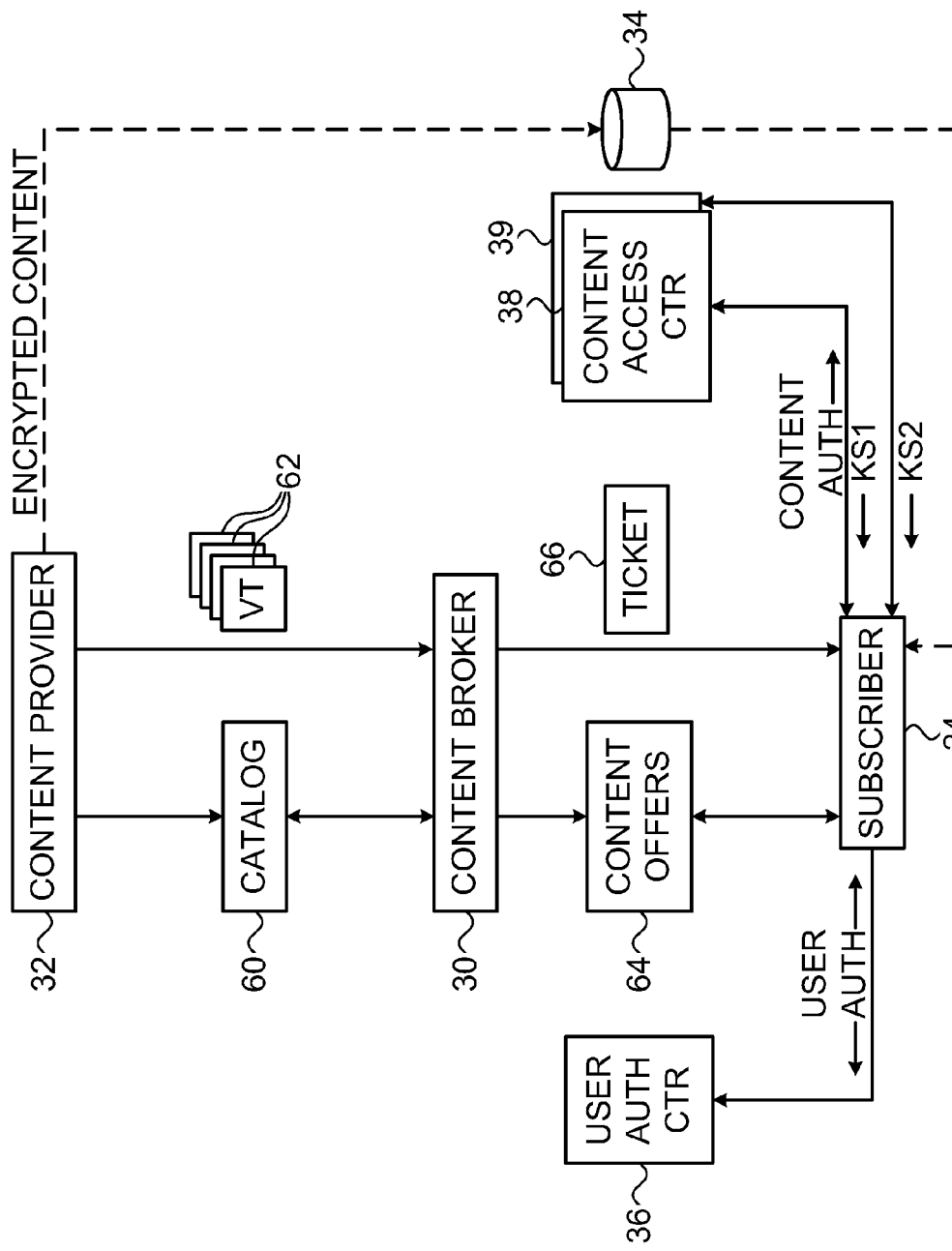
FIG. 3 is a block diagram that schematically illustrates interactions between elements of a content distribution system using a secret-sharing scheme, in accordance with an embodiment of the present invention.

FIG. 3 is a block diagram that schematically illustrates interactions between elements of system 20 in a scheme for content distribution based on virtual tickets, in accordance with an embodiment of the present invention. Content provider (CP) 32 uses a meta-secret held in memory 44 to produce a large number of serialized virtual tickets (VTs) 62 for content items that are listed in a catalog 60. The catalog (but not the content itself) and the VTs are available on-line to any content broker (such as CB 30). Each VT is good for one content item (or package) and one virtual user, and contains individual secret-shares S1 and S2, which are respectively targeted for the two on-line content access centers (CAC 38 and CAC 39). The secret-shares in each VT may be encrypted, using public keys belonging respectively to CAC 38 and CAC 39, for example. There may be different grades (and prices) of VTs for different types of content items.

CB 30 buys a batch of such VTs 62 as its business needs dictate, by a simple commercial transaction, such as an on-line credit card payment. Only CP 32 has the meta-secret needed to generate the secret-shares. Thus, content brokers (and other parties) are unable to create new valid VTs, and the VTs can be stored in non-secure storage. The entities responsible for content access and key-share generation preclude the use of VT clones.

CB 30 sells or awards content offers 64 to (paying) users, by providing corresponding actual tickets 66 to users registered with UAC 36. (Registration with UAC 36 is typically a one-time process, which provides credentials to the user and user equipment, such as receiver 24, and/or smart card 28. to enable validation and authentication of the user and equipment.) Tickets 66 are the content licenses that enable users to download and decrypt particular items of content from repository 34. When CB 30 sells a content item from catalog 60 to a specific registered user, it creates the corresponding ticket 66 by securely assigning a single VT 62 to the user, and securely binding the identifier of the content item from the catalog, along with any specific rights and limitations (such as expiration date), to the user "identity," including the user's content consumption equipment. The user's authentication and access to the content are handled by separate and independent CAC 38 and CAC 39. CB 30 has no security requirements, as it can neither access the content nor duplicate usable VTs.

Upon receiving ticket 66 from CB 30, receiver 24 sends access requests to CAC 38 and CAC 39, containing its UAC-generated credentials, the ticket, which includes the respective secret-shares S1 and S2 (typically encrypted, as noted above), and the key identifier (which may also be encrypted) for the content item in question. CAC 38 and CAC 39 check the user credentials, authenticate the user, verify that there are no clones to the ticket, and then generate and return the corresponding key-shares KS1 and KS2, respectively to receiver 24. Alternatively, after the user has registered with UAC 36, receiver 24 may receive information that allows it to generate one of the key-shares from ticket 66 itself. CAC 38 (which acts as a sort of on-line smart card, but without knowledge of the control word) verifies that the content access is valid and, if so, uses its secret-share to generate the second key-share. The content access requests sent from receiver 24 to CAC 38 and/or CAC 39 may contain the serial number of the VT, which the CAC checks and then invalidates after use to prevent re-use and clones.

CAC 38 and CAC 39 typically transmit their respective key-shares to receiver 24 in encrypted form. Receiver 24 decrypts and combines the key-shares in order to generate the required key (CW) from the two key-shares. The receiver then applies this CW in decrypting the content from repository 34.

In this system configuration, neither one of the content access centers alone nor the CB can itself produce the CW and access the content. Given this compartmentalization, there is no need for heavy operational security constraints to be imposed on any of these entities. There is also no need to maintain large databases of keys, since the key-share derivation is based on running a key-share generation function over the data in each ticket.

Figure 4:
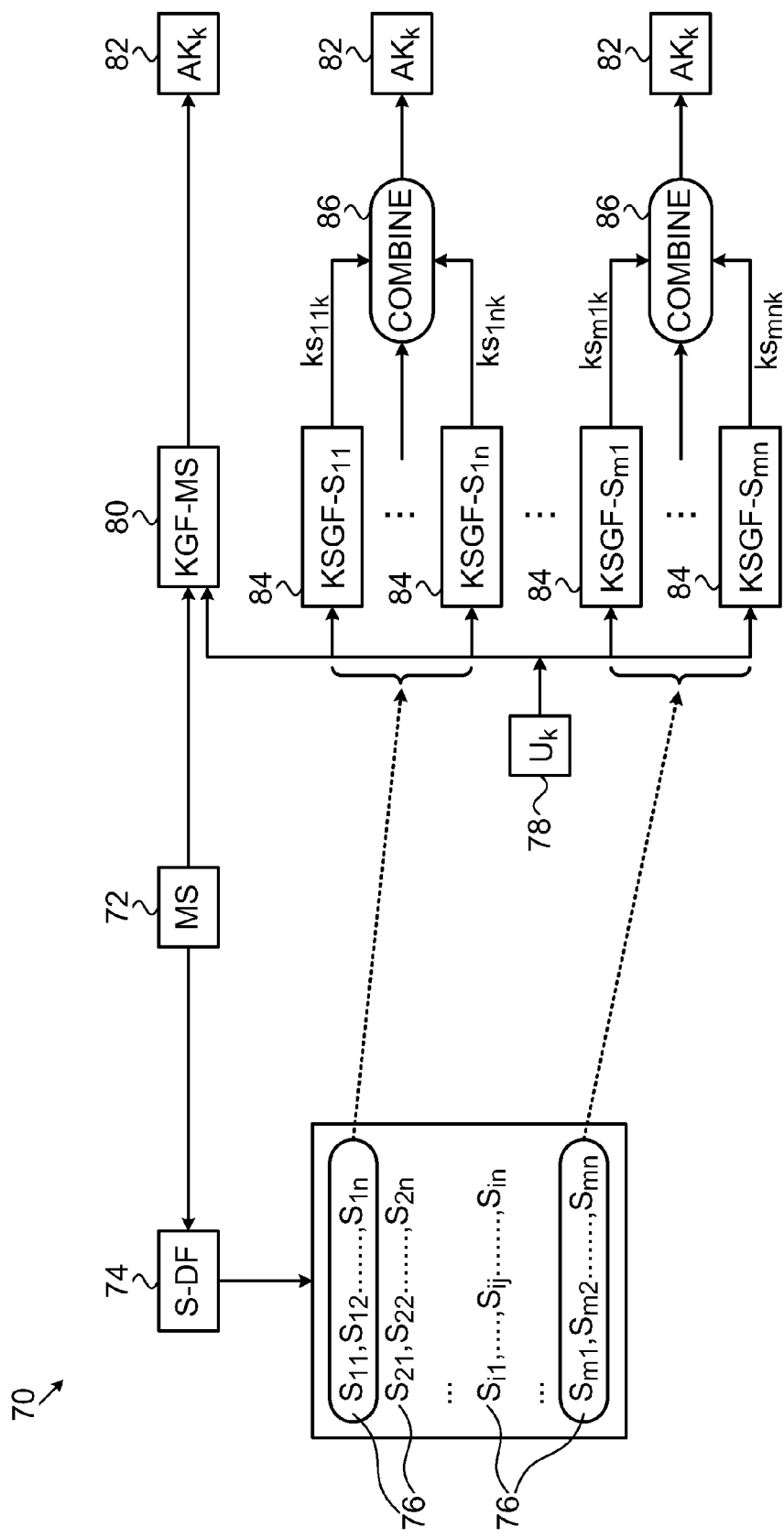
FIGS. 4-6 are block diagrams that schematically illustrate schemes for key generation, in accordance with an embodiment of the present invention.

FIG. 4 is a block diagram that schematically illustrates a scheme 70 for key generation that is used in system 20, in accordance with an embodiment of the present invention. Although the scheme illustrated in FIG. 3 uses only two secret-shares and two corresponding key-shares, the principles of the scheme are generalized in FIG. 4 to including n secret-shares and key-shares. The upper row of blocks in the figure represents actions carried out by CP 32 in generating secret-shares and keys, while the remainder of the figure refers to actions of the secret-share holders.

CP 32 applies a secret-decomposition function (S-DF) 74 to a meta-secret (MS) 72 in order to generate multiple sets 76 of secret-shares $S_{ij}$. The meta-secret and secret-shares may have the form of sequences of matrices, as described in detail in the Appendix. Alternatively, other equivalent forms may be used. In the example shown in FIG. 4, there are m sets 76 with n secret-shares in each set. (Each secret-share $S_{ij}$ can be decomposed in an equivalent manner into its own equivalent subset of secret-shares, as explained further in the Appendix.) Each secret-share in a given set is typically held by a different secret-holder. All of sets 76 are equivalent, in that any of these sets can be used, together with the appropriate unique key identifier ($U_k$) 78, to generate a key ($AK_k$) 82. The same sets 76 can be reused indefinitely to generate different keys based on different key identifiers.

To generate the content access key $AK_k$ for the content item identified by $U_k$ (for encryption of a given content item, for example), CP 32 applies a meta-secret-based key-generation function (KGF-MS) 80 to MS 72, using identifier ($U_k$) 78. Each secret-share holder derives its key-share for a given key using a different function: Each secret-share $S_{ij}$ is used in a specific key-share generation function (KSGF-$S_{ij}$) 84 together with $U_k$ to generate a respective key-share ($ks_{ijk}$). (In this notation, the index i refers to the set of secret-shares, j to the secret-holder, and k to the key itself.) A combiner 86 mathematically combines the key-shares in a prescribed way to generate $AK_k$. Details of the key generation process are described in the Appendix. In the scenario shown in FIG. 3, key-share generation functions (KSGF-$S_{ij}$) 84 are typically carried out by CAC 38 and CAC2 39, while combiner 86 is implemented in receiver 24, as a function of smart card 28, for example.

Joint Key Derivation and Pairing of Decryption Devices Using Secret-Shares

Figure 5:
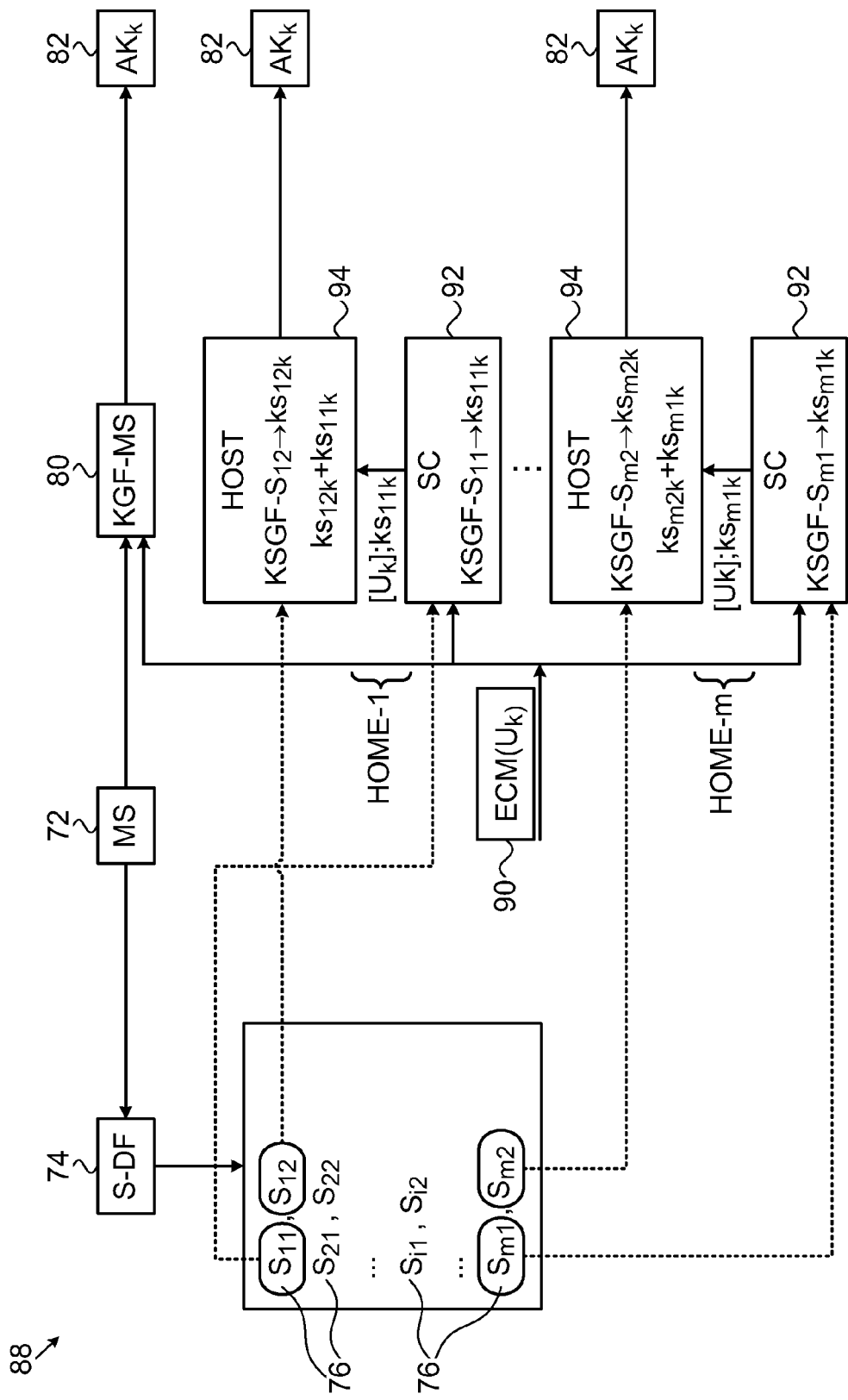

FIG. 5 is a block diagram that schematically illustrates a scheme 88 for key generation that may be used in receiver 24, in accordance with an embodiment of the present invention. This method uses pairing between receiver 24 and smart card 28, wherein one secret-share in each set 76 ($S_{i1}$) is stored and applied by processor 52 in generating a first key-share, and the other secret-share ($S_{i2}$) is stored and applied by host processor 56 to generate a second key-share. Host processor 56 combines the key-shares to generate key 82. This approach is advantageous, as noted above, in preventing users from sharing smart cards among different receivers and from distributing the key-share generated by one smart card to other (non-paired) receivers. In addition, hacking receiver 24 or smart card 28 for its key share or secret share will not by itself permit theft of the control words.

The underlying principles of scheme 88 are similar to those of scheme 70, as described above, and generation of sets 76 of secret-shares and of key 82 from meta-secret 72 may be carried out in an identical fashion. Each set 76 of secret-shares is typically installed in a different receiver, labeled "HOME-1" to "HOME-m" in FIG. 5 to refer to the different subscriber premises in which the receivers are used.

When the user of receiver 24 selects an item of content, the corresponding key identifier $U_k$ may be transmitted to the receiver over network 22, possibly in encrypted form, for example in an ECM 90. Processor 52 in smart card 28 decrypts the ECM (if encrypted) and then uses the key identifier together with the secret-share $S_{i1}$ in a key-share generation function (KSGF-$S_{i1}$) 92 to generate the key-share $ks_{i1k}$. The smart card passes this key share together with the key identifier $U_k$ to host processor 56. For enhanced security, the key identifier and/or the key-share of smart card 28 may be passed to the host processor in encrypted form. Host processor 56 applies the key identifier $U_k$ in its own key-share generation function (KSGF-$S_{i2}$) 94 to generate the second key-share $ks_{i2k}$. It then combines the two key-shares to generate key 82 and uses this key as the control word for decrypting the content item.

Figure 6:
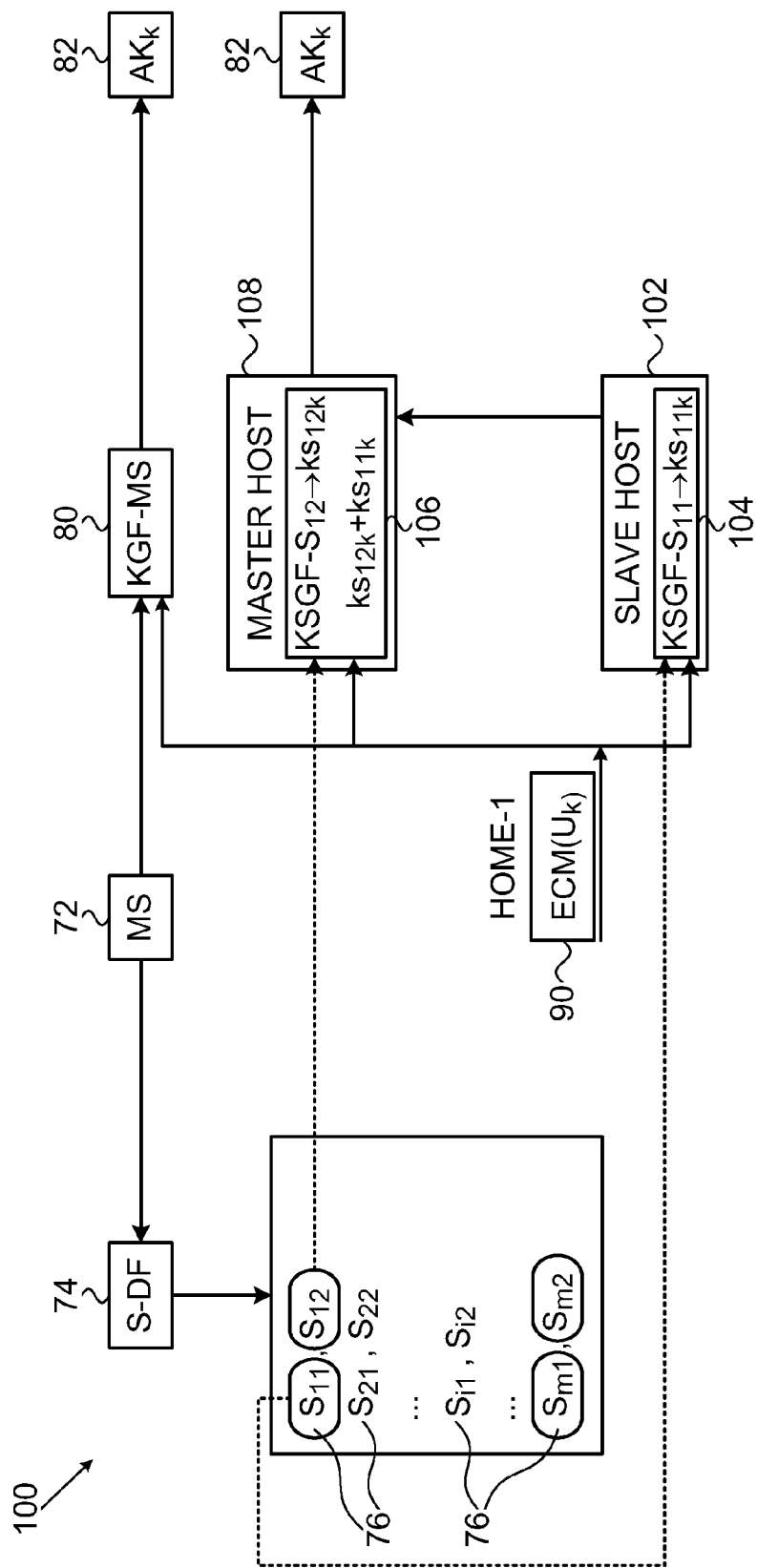

FIG. 6 is a block diagram that schematically illustrates a scheme 100 for key generation in a subscriber premises, in accordance with another embodiment of the present invention. This method uses pairing between two host devices, referred to as a master host 108 and a slave host 102, which may have respective smart cards 106 and 104. For example, hosts 102 and 108 may be two separate set-top boxes, personal computers, or entertainment consoles, or a combination of such devices, which are connected to communicate with one another over a local (wired or wireless) network in the subscriber premises or even over the Internet. When each host has a smart card, each of smart cards 104 and 106 stores one of the two secret-shares in the set 76 that is assigned to the subscriber.

When the subscriber selects an item of content, both of smart cards 104 and 106 receive the key identifier $U_k$, which is typically encrypted and transmitted to hosts 102 and 108 in ECM 90. Smart card 104 in slave host 102 decrypts the ECM and then uses the key identifier together with the secret-share $S_{i1}$ in the key-share generation function KSGF-$S_{i1}$ to generate the key-share $ks_{i1k}$, which it passes to master host 108. Smart card 106 applies the second key-share generation function KSGF-$S_{i2}$ to generate the second key-share $ks_{i2k}$, which it then combines with $ks_{i1k}$ to generate key 82. Master host 108 uses this key as the control word for decrypting the content item.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Computation of Secret-Shares and Keys

Meta-Secret, MS

A number N is known to everyone, wherein N=P·Q. P and Q are the two secret primes that factor N. Factoring the large N to its primes is widely accepted as a hard mathematical problem and thus is used here and in other cryptographic schemes.

The meta-secret MS in the derivation below consists of a sequence of L 2×2 matrices $C_1, \ldots, C_L$ whose entries are in $Z_N$ (residues modulo N). The matrices $\{C_i\}$ commute, i.e., $C_i \cdot C_j = C_j \cdot C_i$. The use of 2×2 matrices is computationally convenient, but the principles of the present method can be extended in a straightforward manner to matrices of any desired size (such as 3×3).

Secret Decomposition Function, S-DF

MS can be decomposed into secret shares that serve specific (useful) purposes, and as such possess certain properties. In fact, many sets of secret-shares can be derived from MS.

We define the $i^{th}$ set of secret shares as: $\{S_{i,1}, S_{i,2}, \ldots, S_{i,j}, \ldots, S_{i,n}\}$; other sets are given as i=1, ..., m. The secret-shares of the $i^{th}$ set are defined as below:

$$S_{i,1} = \{A_{i,1,1}, A_{i,1,2}, \ldots A_{i,1,L}\}$$
$$S_{i,2} = \{A_{i,2,1}, A_{i,2,2}, \ldots A_{i,2,L}\}$$
$$\ldots$$
$$S_{i,j} = \{A_{i,j,1}, A_{i,j,2}, \ldots A_{i,j,L}\}$$
$$\ldots$$
$$S_{i,n} = \{A_{i,n,1}, A_{i,n,2}, \ldots A_{i,n,L}\},$$

Here $A_{i,j,k}$ is a 2×2 matrix with entries in $Z_N$, and all pairs of the matrices in $S_{i,j}$ commute. By varying i=1, ..., m, we get secret-shares belonging to other sets.

Let $A \otimes B$ denote the tensor product of matrices A, B, $\chi(A)$ be the characteristic polynomial of matrix A, and $f(x)|g(x)$ indicate that the polynomial f divides the polynomial g. The matrices $A_{i,j,k}$ are chosen in a way that satisfies, for i=1, ..., m:

$$\chi(C_1) | \chi(A_{i,1,1} \otimes A_{i,2,1} \otimes \ldots \otimes A_{i,n,1})$$
$$\ldots$$
$$\chi(C_k) | \chi(A_{i,1,k} \otimes A_{i,2,k} \otimes \ldots \otimes A_{i,n,k})$$
$$\ldots$$
$$\chi(C_L) | \chi(A_{i,1,L} \otimes A_{i,2,L} \otimes \ldots \otimes A_{in,L})$$

Construction of a Set of Secret-Shares

Generation of the $i^{th}$ set of secret-shares $S_{i,1}, S_{i,2}, \ldots, S_{i,n}$ (i=1,m) from $C_1, \ldots, C_L$ is carried as follows:

We randomly select L·(n−1) 2×2 matrices with non-zero determinants that commute with $C_1, \ldots, C_L$, and are denoted as:

$A'_{i,1,1}, A'_{i,1,2}, \ldots A'_{i,1,L}$,
$A'_{i,2,1}, A'_{i,2,2}, \ldots A'_{i,2,L}, \ldots, A'_{i,n-1,2}, \ldots A'_{i,n-1,L}$ We define the remaining matrices $A'_{i,n,1}, A'_{i,n,2}, \ldots A'_{i,n,L}$ as follows:

$$A'_{i,n,k} = C_k \cdot (A'_{i,1,k} \cdot A'_{i,2,k} \cdot \ldots \cdot A'_{i,n-1,k})^{-1} \text{ for } k=1, \ldots, L.$$

Definition of $A_{i,j,r}$

For $1 \leq i \leq m$ and $1 \leq j \leq n$ we select a random invertible matrix $T_{i,j}$ and define $A_{i,j,r} = T_{i,j} \cdot A'_{i,j,r} \cdot T_{i,j}^{-1}$. Thus the $i^{th}$ set of secret-shares $S_{i,1}, S_{i,2}, \ldots, S_{i,j}, \ldots, S_{i,n}$ is given by: $S_{i,j} = \{A_{i,j,1}, A_{i,j,2}, \ldots A_{i,j,L}\}$, for j=1, ..., n.

Calculation of the kth Asset Key, $AK_k$

There are two ways to generate $AK_k$:
a.) using MS, or
b.) using any set of secret-shares.

The parameter k identifies the key.

MS Creation of $AK_k$ (KGF-MS)

The creator of $AK_k$ is the possessor of the meta-secret MS. We transform k into a sequence of L bits (using a hash function) $k \to (b_{k,1}, b_{k,2}, \ldots, b_L)$. The key $AK_k$ is defined as follows: $AK_k = tr(\Pi_{l=1}^{L} C_i^{b_{k,i}})$, wherein $C_i^{b_{k,i}} = C_i$ for $b_{k,i}=1$ and $C_i^{b_{k,i}} = I$ for $b_{k,i}=0$.

(Note: for a 2×2 matrix X, $tr(X) = X_{1,1} + X_{2,2}$.)

From Set of Secret-Shares to $AK_k$ ($KSGF-S_{i,j}$)

Given the $i^{th}$ set of secret-shares $S_{i,1}, S_{i,2}, \ldots, S_{i,n}$ (wherein $S_{i,j} = \{A_{i,j,1}, A_{i,j,2}, \ldots A_{i,j,L}\}$), we calculate $AK_k$ as follows:

The $j^{th}$ secret holder (j=1, n) calculates the matrix $B_{k,j} = \Pi_{r=1}^{L} A_{i,j,r}^{b_{k,j}}$ and defines the values $t_{k,j} = tr(B_{k,j})$ and $d_{k,j} = det(B_{k,j})$.

The combiner gets the pairs $(t_{k,j}, d_{k,j})$ for all $1 \le j \le n$ and calculates a polynomial $P_{k,n}(x)$ of degree $2^n$ defined by the following recursive process:

$D_{k,1}$ is the 2×2 matrix $$\begin{pmatrix} 0 & 1 \\ -d_{k,1} & t_{k,1} \end{pmatrix}$$

Let $D_{k,j}$ be a matrix of dimension $2^{j-1} \times 2^{j-1}$ generated in the recursive process for $1 \le j \le n-1$.

We define the matrix $D_{k,n}$ as follows:

$$D_{k,n} = D_{k,n-1} \otimes \begin{pmatrix} 0 & 1 \\ -d_{k,n} & t_{k,n} \end{pmatrix}.$$

$D_{k,n}$ is a $2^n \times 2^n$ matrix of the form $$\begin{pmatrix} 0_{2^{n-1} \times 2^{n-1}} & D_{k,n-1} \\ -d_{k,n} \cdot D_{k,n-1} & t_{k,n} \cdot D_{k,n-1} \end{pmatrix}.$$

The polynomial $P_{k,n}(x)$ is defined as the characteristic polynomial of the matrix $D_{k,n}$.

The polynomial $P_{k,n}(x)$ contains the information needed to generate $AK_k$; we present two methods to calculate $AK_k$ from $P_{k,n}(x)$:

is the matrix

First method: A center that knows MS sends the following couple: $(k, q_k(x))$. In this expression, the polynomial $q_k(x)$ is a third-degree polynomial calculated as follows: Let $h_k(x)$ be the second-degree characteristic polynomial of the matrix $\Pi_{i=1}^{n} C_i^{b_{k,i}}$. The coefficient of x in $h_k(x)$ is $-AK_k$. We select a random element $\alpha$ and define $q_k(x) = (x-\alpha) \cdot h_k(x)$.

The combiner calculates $gcd(q_k(x), P_k(x))$. The greatest common denominator of these polynomials is equal to $h_k(x)$, and $AK_k$ can be extracted from the coefficient of x.

Second method (without the center): Every one of the secret holders has two sets of secrets, for example, the jth secret holder has $S_{i,j}$ and $S_{i',j}$. The combiner calculates the two polynomials $P_k(x)$ and $P'_k(x)$, using the matrices in $S_{i,j}$ and $S_{i',j}$ respectively. Then the combiner calculates the second-degree polynomial $gcd(P'_k(x), P_k(x))$, which is equal to $h_k(x)$. The value $AK_k$ is obtained from the coefficient of x.

It is possible to show that calculation of $AK_k$ for a new k is hard problem even when the values of $AK_{k_1}, AK_{k_2}, \ldots AK_{k_m}$ are given for arbitrary values $k_1, k_2, \ldots k_m$.

Decomposition of Secret-Shares

Any secret share S (derived from MS) can be decomposed in the same way as was MS to generate one or more subsidiary sets of secret shares, wherein each of the sets is equivalent to S in producing keys. A tree of equivalent secret-shares set for a given secret-share can be constructed in this manner to arbitrary depth.

For example, consider three generals (secret holders 1,2 and 3) with secret-shares S1, S2 and S3, respectively, derived from MS, such that all three of them are needed to produce the key for a missile site. Assume general 1 is a traveling man and often not available to partake in the key generation ceremony. His secret share S1 can be decomposed into two set of three secret shares:

$S_{11}, S_{12}$ and $S_{13}$
$S'_{11}, S'_{12}$ and $S'_{13}$ which are given to three of his trusted colonels, respectively. Each colonel gets two secret shares, one from each set:

colonel1 gets $S_{11}, S'_{11}$;
colonel2 gets $S_{12}, S'_{12}$,
colonel3 gets $S_{12}, S'_{12}$, If general 1 is unavailable to produce his key-share, then the three colonels' secret-shares are a replacement for the general in the sense that the colonels can jointly generate the general's key-share.

The above process follows exactly the methodology and complexity of the MS decomposition and key-share generation functions that were described above.

Alternatively one could use only a single secret-share per colonel, but then the overall complexity (e.g., matrix size) of the method will be increased.

The invention claimed is:

1. A cryptographic method, comprising:
providing, by a processor, a meta-secret used both to generate a first plurality of cryptographic keys and a second plurality of different sets of secret-shares, each of the cryptographic keys being associated with a respective key identifier, the meta-secret being a secret data structure including an ordered sequence of data values;
generating, by the processor, each one of the cryptographic keys as a function of the meta-secret and the respective key identifier of the one cryptographic key;
creating, using the meta-secret, by the processor, the second plurality of different sets of secret-shares, which are capable:
by combining all the secret-shares in any one of the sets together with the respective key identifier without knowledge of the meta-secret, of generating the associated cryptographic key;
by combining all the secret-shares in any one of the sets together with a first key identifier without knowledge of the meta-secret, of generating a first cryptographic key; and
by combining all the secret-shares in any one of the sets together with a second key identifier without knowledge of the meta-secret, of generating a second cryptographic key;
wherein combining all the secret-shares in any one of the sets together with a different key identifier without knowledge of the meta-secret generates a different cryptographic key;
performing, by the processor, cryptographic operations using the cryptographic keys, wherein performing the cryptographic operations comprises encrypting an item of data using the first cryptographic key; and distributing the sets of secret-shares over a network to different respective subscribers, using a network interface, wherein the different respective subscribers are operative to:

combine the received secret-shares together with the respective key identifier without knowledge of the meta-secret to generate the first cryptographic key; and decrypt the item of data using the first cryptographic key, wherein the secret-shares in one of the sets are decrypted following a process of authentication so that the secret-shares can be used to generate the first cryptographic key so as to decrypt the item of data only after the authentication.

2. The method according to claim 1, wherein performing the cryptographic operations comprises encrypting an item of data using one of the cryptographic keys so as to enable decryption of the item only by combining all the secret-shares in any one of the sets.

3. The method according to claim 2, wherein encrypting the items of data comprises encrypting multiple items of data using different ones of the cryptographic keys, so as to enable decryption of the items by combining all the secret-shares in any one of the sets with different key identifiers that are respectively associated with the different ones of the cryptographic keys.

4. The method according to claim 3, wherein the sets of secret-shares each comprise first and second secret-shares, and wherein the method comprises:

providing the first and second secret-shares in each set to different first and second devices in each of the subscriber premises, which operate in combination to generate the cryptographic keys so as to decrypt the items of data.

5. The method according to claim 4, wherein the first and second devices respectively comprise a security module and a host device, to which the security module is coupled and which is configured to output the decrypted items of data.

6. The method according to claim 4, wherein the first and second devices comprise respective first and second security modules.

7. The method according to claim 1, wherein the sets of secret-shares each comprise first and second secret-shares, which are decrypted respectively by two independent content access centers.

8. The method according to claim 1, wherein the items of the data are encrypted and the secret-shares are generated by a content provider, and wherein the secret-shares are distributed with the key identifiers to the subscribers by a content broker, which is unable to access the items of the data in an unencrypted form or to generate the secret-shares or the cryptographic keys.

9. The method according to claim 1, wherein the meta-secret comprises a sequence of matrices, and wherein generating the cryptographic keys comprises computing a respective bit string corresponding to each key identifier, and taking a trace of a product of a sub-sequence of the matrices that is indexed by the bit string.

10. The method according to claim 9, wherein computing the respective bit string comprises calculating a hash function over the key identifier.

11. The method according to claim 1, wherein combining all the secret-shares comprises:

applying each of the secret-shares within a set together with the key identifier to generate a respective key-share, thereby producing multiple, different key-shares; and combining the key-shares to generate the cryptographic key.

12. The method according to claim 1, wherein the meta-secret comprises a first sequence of first matrices, and wherein creating the sets of the secret-shares comprises, for a given secret-share within a set, finding a second sequence of second matrices such that a first characteristic polynomial of a $k^{th}$ matrix in the first sequence of first matrices divides a second characteristic polynomial of a tensor product of all $k^{th}$ second matrices in the second sequence for all the secret-shares in the set.

13. The method according to claim 12, wherein finding the second sequences comprises:

finding matrices $\{A_{ijk}'\}$ such that a product of all the matrices $A'_{ijk}$ over a secret-share index j within the set is equal to the $r^{th}$ matrix in the first sequence, and all $A'_{ijk}$ commute for all indices j and r; and transforming the matrices $\{A_{ijk}'\}$ using random invertible matrices $T_{i,j}$ to give transformed matrices $A_{ijk} = T_{i,j} \cdot A_{ijk}' \cdot T_{i,j}^{-1}$ that make up the secret-shares.

14. The method according to claim 12, wherein combining all the secret-shares comprises, for a given set in the second plurality:

computing a bit string corresponding to the respective key identifier;

for each of the secret-shares in the given set, computing a product of a respective sub-sequence of the second matrices that is indexed by the bit string, and generating a polynomial based on the product; and extracting a coefficient of the polynomial to provide the cryptographic key that is associated with the key identifier.

15. The method according to claim 14, wherein generating the polynomial comprises:

taking a recursive tensor product of a set of third matrices defined by the product of the respective sub-sequence for all the secret-shares;

extracting a characteristic polynomial from the tensor product of all the third matrices; and finding a greatest common denominator of the characteristic polynomial with a further polynomial that is associated with the key identifier to give a result polynomial from which the coefficient is extracted.

16. The method according to claim 1, and comprising decomposing at least one of the secret-shares to generating a subsidiary set of subsidiary secret-shares, which are capable, by combining all the subsidiary secret-shares in the subsidiary set together with the respective key identifier, of generating a key-share associated with the at least one of the secret-shares.

17. Cryptographic apparatus, comprising:

a memory, which is configured to hold a meta-secret used both to generate a first plurality of cryptographic keys and a second plurality of different sets of secret-shares, each of the cryptographic keys being associated with a respective key identifier, the meta-secret being a secret data structure including an ordered sequence of data values; and a processor, which is configured:

to generate each one of the cryptographic keys as a function of the meta-secret and the respective key identifier of the one cryptographic key;

to create, using the meta-secret, the second plurality of different sets of secret-shares, which are capable:

by combining all the secret-shares in any one of the sets together with the respective key identifier without knowledge of the meta-secret, of generating the associated cryptographic key;

by combining all the secret-shares in any one of the sets together with a first key identifier without knowledge of the meta-secret, of generating a first cryptographic key; and by combining all the secret-shares in any one of the sets together with a second key identifier without knowledge of the meta-secret, of generating a second cryptographic key;

wherein combining all the secret-shares in any one of the sets together with a different key identifier without knowledge of the meta-secret generates a different cryptographic key;

to perform cryptographic operations using the cryptographic keys; and to distribute the sets of secret-shares over a network to different respective subscribers, using a network interface, wherein performing the cryptographic operations comprises encrypting an item of data using the first cryptographic key and wherein the different respective subscribers are operative to:

combine the received secret-shares together with the respective key identifier without knowledge of the meta-secret to generate, the first cryptographic key; and decrypt the item of data using the first cryptographic key, wherein the secret-shares in one of the sets are decrypted following a process of authentication so that the secret-shares can be used to generate the first cryptographic key so as to decrypt the item of data only after the authentication.

18. A computer software product, comprising a non-transitory computer-readable medium in which program instructions are stored, which instructions, when read by a computer, cause the computer to:

provide a meta-secret used both to generate a first plurality of cryptographic keys and a second plurality of different sets of secret-shares, each of the cryptographic keys being associated with a respective key identifier, the meta-secret being a secret data structure including an ordered sequence of data values;

generate each one of the cryptographic keys as a function of the meta-secret and the respective key identifier of the one cryptographic key;

create, using the meta-secret, the second plurality of different sets of secret-shares, which are capable:

by combining all the secret-shares in any one of the sets together with the respective key identifier without knowledge of the meta-secret, of generating the associated cryptographic key;

by combining all the secret-shares in any one of the sets together with a first key identifier without knowledge of the meta-secret, of generating a first cryptographic key; and by combining all the secret-shares in any one of the sets together with a second key identifier without knowledge of the meta-secret, of generating a second cryptographic key;

wherein combining all the secret-shares in any one of the sets together with a different key identifier without knowledge of the meta-secret generates a different cryptographic key;

perform cryptographic operations using the cryptographic keys, wherein performing the cryptographic operations comprises encrypting an item of data using the first cryptographic key; and distribute the sets of secret-shares over a network to different respective subscribers, using a network interface, wherein the different respective subscribers are operative to:

combine the received secret-shares together with the respective key identifier without knowledge of the meta-secret to generate the first cryptographic key; and decrypt the item of data using the first cryptographic key, wherein the secret-shares in one of the sets are decrypted following a process of authentication so that the secret-shares can be used to generate the first cryptographic key so as to decrypt the item of data only after the authentication.

* * * * *

UNITED STATES PATENT AND TRADEMARK OFFICE
CERTIFICATE OF CORRECTION

PATENT NO. : 9,106,407 B2  
APPLICATION NO. : 13/976717  
DATED : August 11, 2015  
INVENTOR(S) : Kipnis et al.

Page 1 of 1

It is certified that error appears in the above-identified patent and that said Letters Patent is hereby corrected as shown below:

IN THE SPECIFICATION

In column 12, line 58, delete " $A'_{i,2,1} A'_{i,2,2},...A'_{i,2,L},..., A'_{i,n-1,2},...A'_{i,n-1,L}$ " and substitute therefor -- $A'_{i,2,1}, A'_{i,2,2},...A'_{i,2,L},..., A'_{i,n-1,1}, A'_{i,n-1,2},...A'_{i,n-1,L}$ --.

In column 13, line 9, delete "$(b_{k,1}, b_{k,2},..., b_L)$" and substitute therefor -- $(b_{k,1}, b_{k,2},..., b_{k,L})$ --.

In column 13, line 10, delete " $AK_k = tr(\Pi_{i=1}^{L} C_i^{bk,i})$ " and substitute therefor -- $AK_K = tr\left(\Pi_{i=1}^{L} C_i^{b_{k,i}}\right)$ --.

In column 13, line 17, delete " $\Pi_{r=1}^{L} A_{i,j,r}^{bk,j}$ " and substitute therefor -- $\Pi_{r=1}^{L} A_{i,j,r}^{b_{k,j}}$ --.

In column 13, line 56, delete " $\Pi_{i=1}^{n} C_i^{bk,i}$ " and substitute therefor -- $\Pi_{i=1}^{n} C_i^{b_{x,i}}$ --.

Signed and Sealed this  
Twenty-third Day of February, 2016

Michelle K. Lee  
*Director of the United States Patent and Trademark Office*